United States Patent
Burnside et al.

(10) Patent No.: US 10,571,028 B2
(45) Date of Patent: Feb. 25, 2020

(54) CERAMIC SEAL RUNNER SUPPORT SYSTEM

(71) Applicant: Rolls-Royce Corporation, Indianapolis, IN (US)

(72) Inventors: Phillip Howard Burnside, Avon, IN (US); John Munson, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 15/426,281

(22) Filed: Feb. 7, 2017

(65) Prior Publication Data

US 2017/0234432 A1    Aug. 17, 2017

Related U.S. Application Data

(60) Provisional application No. 62/295,944, filed on Feb. 16, 2016.

(51) Int. Cl.
*F16J 15/34*     (2006.01)
*F16J 15/44*     (2006.01)

(52) U.S. Cl.
CPC ......... *F16J 15/3464* (2013.01); *F16J 15/441* (2013.01)

(58) Field of Classification Search
CPC .... F16J 15/3464; F16J 15/441; F16J 15/3268; F16J 15/166; F01D 11/003
See application file for complete search history.

(56) References Cited

U.S. PATENT DOCUMENTS

| | | | | |
|---|---|---|---|---|
| 2,937,039 A | * | 5/1960 | Santapa | F16J 15/348 277/422 |
| 3,632,117 A | * | 1/1972 | Villasor | F16J 15/3464 277/388 |
| 3,948,533 A | | 4/1976 | Novosad | |
| 4,036,505 A | * | 7/1977 | Floyd | F16J 15/3496 277/405 |
| 4,174,844 A | * | 11/1979 | Zobens | F16J 15/3404 277/390 |
| 4,361,334 A | | 11/1982 | Amorese et al. | |
| 5,014,999 A | * | 5/1991 | Makhobey | F01D 11/003 277/422 |
| 5,017,022 A | * | 5/1991 | Ruggles | F16C 17/03 384/100 |
| 5,183,270 A | | 2/1993 | Alten et al. | |

(Continued)

FOREIGN PATENT DOCUMENTS

EP    2474711 A2    7/2012

OTHER PUBLICATIONS

European Patent Office, Extended European Search Report for corresponding EP Application No. 17156113.7 dated Jun. 21, 2017, 5pgs.

*Primary Examiner* — Eugene G Byrd
(74) *Attorney, Agent, or Firm* — Duane Morris LLP

(57) ABSTRACT

A circumferential seal for a rotating machine having a ceramic runner and support system is provided. The circumferential seal may comprise a sealing runner having a radially inward facing surface and a mounting element. The mounting element may comprise a radial pilot, an axial flange, an isolating element, a spring element to provide an axially clamping force to the runner, and a support ring extending axially along a shaft a distance greater than the radially inward facing surface of the runner.

19 Claims, 3 Drawing Sheets

(56) References Cited

U.S. PATENT DOCUMENTS

| | | | |
|---|---|---|---|
| 6,142,476 A * | 11/2000 | Iwane | F16J 15/3464 |
| | | | 277/358 |
| 6,322,081 B1 * | 11/2001 | Ullah | F16C 33/76 |
| | | | 277/504 |
| 6,655,695 B1 | 12/2003 | Sund et al. | |
| 6,918,594 B2 | 7/2005 | Sund et al. | |
| 8,657,297 B2 | 2/2014 | Garrison | |
| 2009/0134584 A1 * | 5/2009 | Lederer | F16J 15/342 |
| | | | 277/369 |
| 2009/0142180 A1 * | 6/2009 | Munson | F01D 11/001 |
| | | | 415/111 |
| 2009/0152818 A1 * | 6/2009 | Droscher | F16J 15/3464 |
| | | | 277/370 |
| 2011/0123329 A1 | 5/2011 | Takeuchi et al. | |
| 2011/0175297 A1 * | 7/2011 | Fesl | F16J 15/3464 |
| | | | 277/358 |
| 2012/0133099 A1 * | 5/2012 | Fesl | F16J 15/3464 |
| | | | 277/358 |
| 2012/0177486 A1 | 7/2012 | Ullah et al. | |
| 2013/0285331 A1 * | 10/2013 | Kostka | F01D 11/003 |
| | | | 277/411 |
| 2014/0265151 A1 * | 9/2014 | Vasagar | F01D 11/003 |
| | | | 277/500 |
| 2015/0115539 A1 | 4/2015 | Guenther et al. | |
| 2015/0240951 A1 * | 8/2015 | Kirchner | F16J 15/3464 |
| | | | 277/500 |
| 2017/0234430 A1 * | 8/2017 | Fadgen | F16J 15/3464 |
| | | | 277/500 |

* cited by examiner

CERAMIC SEAL RUNNER SUPPORT SYSTEM

CROSS-REFERENCE TO RELATED APPLICATIONS

This application claims the benefit of U.S. Provisional Application No. 62/295,944, filed Feb. 16, 2016.

FIELD OF THE DISCLOSURE

The present disclosure is directed to systems and methods for providing mounting support systems for seal runners for rotating machines.

BACKGROUND

In rotating machinery, the passages between fixed structures surrounding rotating components provide pathways for leakage of either the working fluid or support-system fluids. These pathways may allow support-system fluids, such as lubricating oil, to leak into the working fluid, or may allow the working fluid to leak into these support systems. These leaks along the shaft, or rotor, of the rotating machinery result in lower operating efficiency and quicker degradation of machine components, thereby requiring shorter maintenance intervals and more frequent replacement of parts.

To inhibit leakage through these pathways, rotating machines use various types of seals and sealing techniques. Circumferential seals, one type of these seals, are commonly used to prevent fluid leakage between compartments of the machine. Specific types of circumferential seals include controlled-gap seals, arch-bound circumferential seals, and segmented circumferential contacting seals. Each of these types of seals comprise a rotating component called a "seal rotor," also known as a "runner," and a non-rotating component called a "ring seal" or "circumferential seal."

A common circumferential seal configuration comprises a seal rotor composed of a metallic material and a ring seal composed of carbon. This configuration exhibits a high degree of friction between the metallic rotor and the radially inner surface of the carbon ring seal. This friction wears the carbon seal quickly, resulting in the need for more frequent inspection and replacement. To avoid this friction at the sealing interface, a circumferential seal may be designed such that a small gap exists between the metallic seal rotor and the carbon seal. However, differences between the coefficients of thermal expansion (CTE) of the metallic seal rotor and the carbon ring seal will affect the size of the rotor-seal gap over the range of machine operating temperatures. Additionally, the metallic seal rotor will undergo mechanical growth due to centrifugal effects, further complicating control of the size of the gap between the seal rotor and ring seal. Consequently, the gap between the rotor and seal may be too large to efficiently seal the machine, or too small resulting in excessive wear to the carbon seal inner diameter and losses in machine efficiency.

A solution to excessively high seal wear or large rotor-seal gaps is to replace the metallic seal rotor (or, runner) with a ceramic runner. A ceramic runner may be chosen with a CTE closer to that of the carbon ring seal than the CTE of a metallic runner to mitigate the effects of thermal expansion. Ceramic may also experience less the mechanical growth from to centrifugal effects because ceramic may have a higher stiffness-to-weight ratio than a metallic compound. The thermal expansion and stiffness-to-weight ratio of ceramic materials allow tighter gaps to be maintained over the operating range of the machine, thereby avoiding some of the above the consequences of using a metallic rotor. Additionally, the use of a ceramic material result in a lower frictional force between the runner and the carbon ring seal, particularly when the ceramic runner sealing surface is lapped. In fact, the ceramic material may have a sufficiently low frictional force with the carbon seal that the two may be in contact during operation without significant wear to the seal or excessively large decreases in machine operating efficiency.

However, the use of ceramic materials imposes other design challenges, particularly in high-temperature applications, such as a jet engine. The circumferential seal runner must circumscribe and be affixed to, directly or indirectly, the shaft of the machine. This shaft is likely to be made of metal. Differences between the material properties of the ceramic and metallic machine components will result in varying stresses on the ceramic component during operating of the machine. These properties may include the CTE of the shaft and the runner materials, resulting in different rates of thermal expansion as temperatures change during machine operations. Other properties include the stiffness-to-weigh ratios of these materials, which produce differing rates and amounts of mechanical growth as the machine rotates. Additional stresses may be caused the assembly of the machine. Some rotating machines are assembled such that subcomponents are axially stacked upon one another around the shaft and groups of subcomponents may be held together by large compressive forces. This method of assembly is known as "lockup assembly." These large compressive forces can create tensile stresses in portions of a ceramic runner. Ceramics may crack under these tensile stresses because they are brittle in nature.

FIG. 1 illustrates a cross-sectional, axial view of a prior art circumferential seal 100. The seal 100 comprises ceramic runner 106 which sealingly engages a carbon ring seal (not shown). The axial and radial alignment of ceramic runner 106 is maintained about shaft 104 by annular clamping members 108 and 110. These annular clamping members 108 and 110 are disposed between parts 116 and 114. Part 116 may be a bearing race or other clamped component, or part 116 may be a threaded nut used to supply a clamping force used to secure annular clamping members 108 and 110 to the shaft 104. The clamping force caused by, or transmitted through, part 116 may pass through an optional spacer 114 to a shoulder 112 of the shaft 104. Shaft 104 rotates about axis 102.

The ceramic runner 106 includes a radially inward extending flange from a main cylindrical body which engages the clamping members 108 and 110. This flange is adapted to receive the clamping force transmitted between the annular clamping members. Clamping member 110 has a length and thickness which allows for some radial flexibility. The annular member 108 may include circumferentially extending slots (not shown) which allow the annular member 108 to expand and contract, thereby imparting axial flexibility.

FIG. 2 illustrates a cross-sectional, axial view of another prior art circumferential seal 200. Seal 200 comprises a ceramic runner 206 which sealingly engages a carbon seal (not shown). Runner 206 is fixed to shaft 204 via clamp members 208 and 210. Clamp member 210 has a length and thickness designed to impart radial flexibility. Clamp member 208 retains an axial spring 218. The axial spring 218 provides an axial clamping force on runner 206. Clamp members 208 and 210 may be maintained in axial alignment along the shaft 204 by parts 214 and 216, which may be similar to parts 114 and 116 described above. Shaft 204 rotates about an axis 202.

While above circumferential seals provide a means for mounting a ceramic runner to a shaft, the smaller CTE of a ceramic runner compared to that of the metallic mounting components and the metallic shaft, as well as the low flexural strength of the ceramic runner, still present problems during the operation of the machine. First, the use of slots on axial support members, or springs between an axial support member and the ceramic runner provide additional leakage pathways. Second, as the temperature of machine rises, the metallic support members will expand more than the ceramic runner; due to the particular designs used in prior systems, the greater expansion of the metal components will increase the stress in the ceramic runner. Third, the runners illustrated in the above figures each require a radially inward extending flange to which the mounting components are engaged. This increases the complexity of the runner design.

Analysis of prior art sealing systems has revealed that the clamping loads generated during assembly of the machine may result in deflections of the individual components. Additionally, the centrifugal forces resulting from rotation of the shaft to which components are applied mounted may cause further deflections. These deflections result in undesirable line-contact loads that increase the risk of failure of the ceramic part and the wear rate of the contacting metal parts.

In accordance with some embodiments of the present disclosure, a circumferential seal for a machine having a rotating shaft is provided. The seal may comprise a sealing runner and a mounting element. The sealing runner may have a radially inward facing surface which extends axially along the shaft. The mounting element may comprise a support ring, a radial pilot, an axial flange, an isolating element, and a spring element. The support ring may have a radially outward facing surface which extends axially along the shaft a distance greater than the radially inward facing surface of the sealing runner. The radial pilot may extend radially outward from the support ring, and an axial flange may radially extend from the radial pilot to provide a surface which engages the runner on one end. A spring element may be provided to transmit a clamping force to the runner to maintain the runner in axial alignment. An isolating element may be provided between the runner and the spring element. In some embodiments, the runner and the support ring define a radially compliant opening to accommodate the relative thermal growth between the ceramic and metallic components without overstressing either. The runner may be ceramic and the mounting element may be metallic.

In accordance with some embodiments of the present disclosure, a circumferential seal for a machine having a rotating shaft is provided. The seal may comprise a sealing runner and a mounting element. The sealing runner may have a radially inward facing surface that extends axially along the shaft. The mounting element may be affixed around the circumference of the shaft, and may comprise a support ring, an axial flange, a radial pilot, and isolating element and a spring element. The support ring may form a radially outward facing surface that extends axially along the shaft a distance greater than the radially inward facing surface of the sealing runner. The radial pilot may extend radial outward from the support ring and may be configured to maintain the sealing runner in radial alignment. The axial flange may extend radially outward from the radial pilot. The isolating element may be in contact with a first axial end of the sealing runner. The spring element may be disposed proximate to the first axial end and may transmit a force through the isolating element to the sealing runner to clamp the sealing runner between the isolating element and the axial flange to maintain the sealing runner in axial alignment.

In accordance with some embodiments of the present disclosure, a circumferential seal for a machine with a metallic rotating shaft is provided. The seal may comprise a ceramic sealing runner and a mounting element. The ceramic sealing runner may have a radially inward facing cylindrical surface that may extend axially along the shaft. The mounting element may be affixed around a circumference of the shaft and may comprise a support ring, a radial pilot, an axial cylindrical flange, a cylindrical washer and a Belleville washer. The support ring may form a radially outward facing cylindrical surface that extends axially along the shaft a distance greater than the radially inward facing cylindrical surface of the ceramic sealing runner. The radial pilot may extend radially outward from the support ring to engage a first axial end of the ceramic sealing runner and may be configured to maintain the ceramic sealing runner in radial alignment. The axial cylindrical flange may extend radially outward from the radial pilot. The cylindrical washer may be in contact with a second axial end of the ceramic sealing runner. The Belleville washer may be disposed proximate to the second axial end and may transmit a force through the cylindrical washer the ceramic sealing runner to clamp the ceramic sealing runner between the cylindrical washer and the axial cylindrical flange to maintain the ceramic sealing runner in axial alignment.

In accordance with some embodiments of the present disclosure, a method of mounting a ceramic seal runner in a rotating machine is provided. The method may comprise providing a seal runner, providing a mounting element, engaging a first axial end of the seal runner, engaging a second axial end of the seal runner, and engaging an isolating element with a spring element. The seal runner may have a radially inward facing surface extending along a shaft of the machine. The mounting element may extend along the shaft of the machine and may have a support ring, a radial pilot, an axial flange, a spring element and an isolating element. The support ring may form a radially outward facing surface facing the radially inward facing surface of the seal runner. The radial pilot may extend radially outward form the support ring. The axial flange may extend radially outward from the radial pilot. The first axial end of the seal runner may engage with the isolating element. The second axial end of the seal runner may engage with axial flange and the radial pilot. The isolating element may engage with the spring element such that a compressive force is transmitted through the isolating element and seal runner to the axial flange, thereby maintaining an axial alignment of the seal runner relative to the shaft. The radial pilot may maintained a radial alignment of the seal runner about the shaft.

These and many other advantages of the present subject matter will be readily apparent to one skilled in the art to which the disclosure pertains from a perusal of the claims, the appended drawings, and the following detailed description of preferred embodiments.

Figure 1:
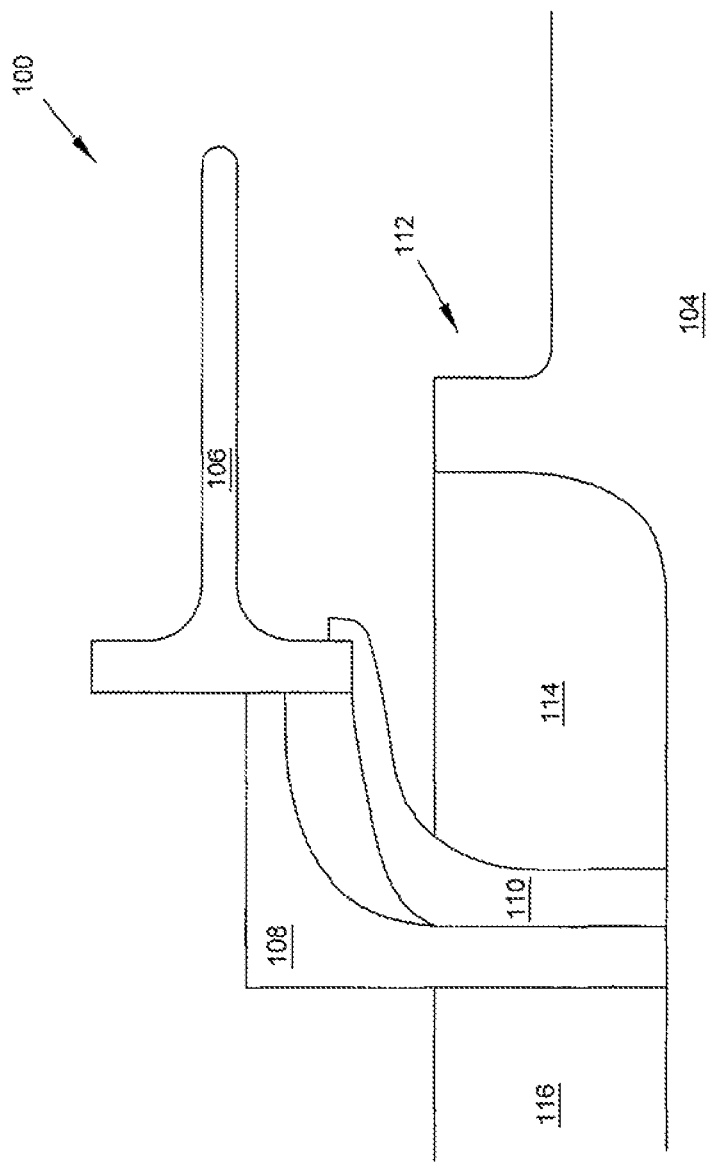
FIG. 1 is a cross-sectional, axial view of a prior art circumferential seal.
Figure 2:
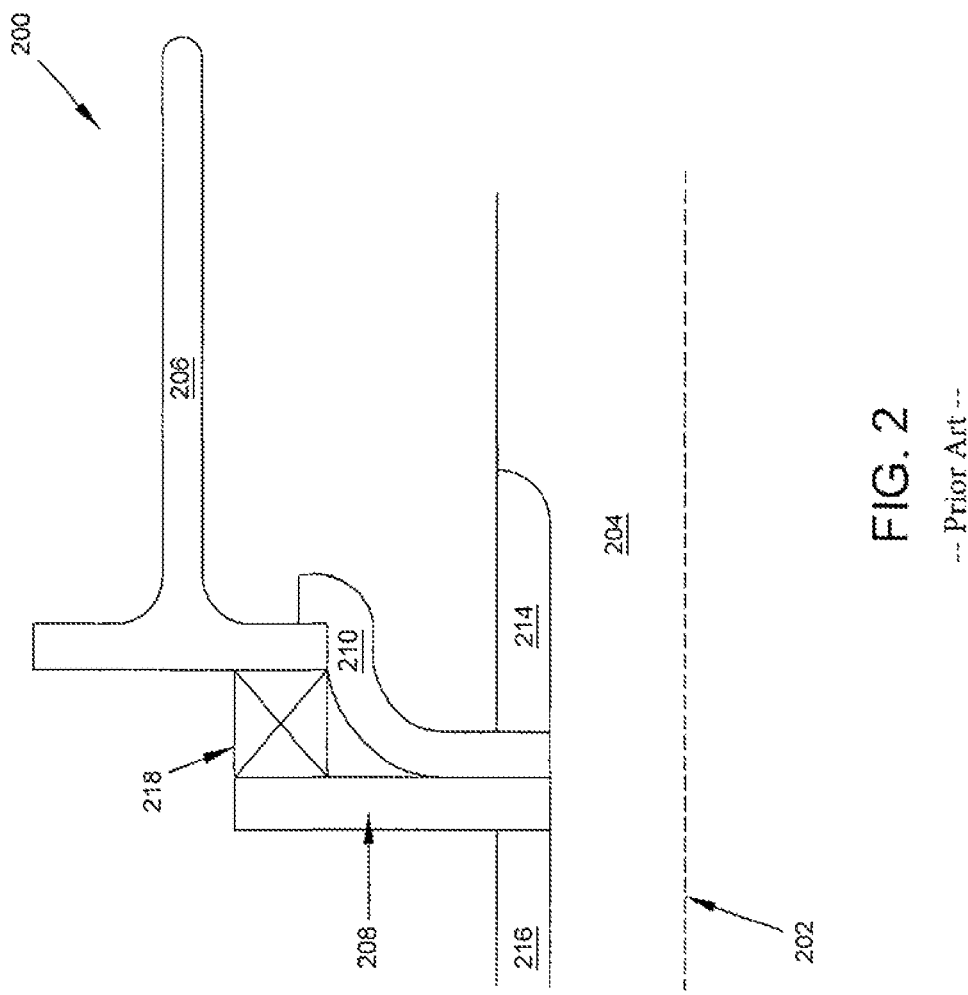
FIG. 2 is a cross-sectional, axial view of a second prior art circumferential seal.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

Figure 3:
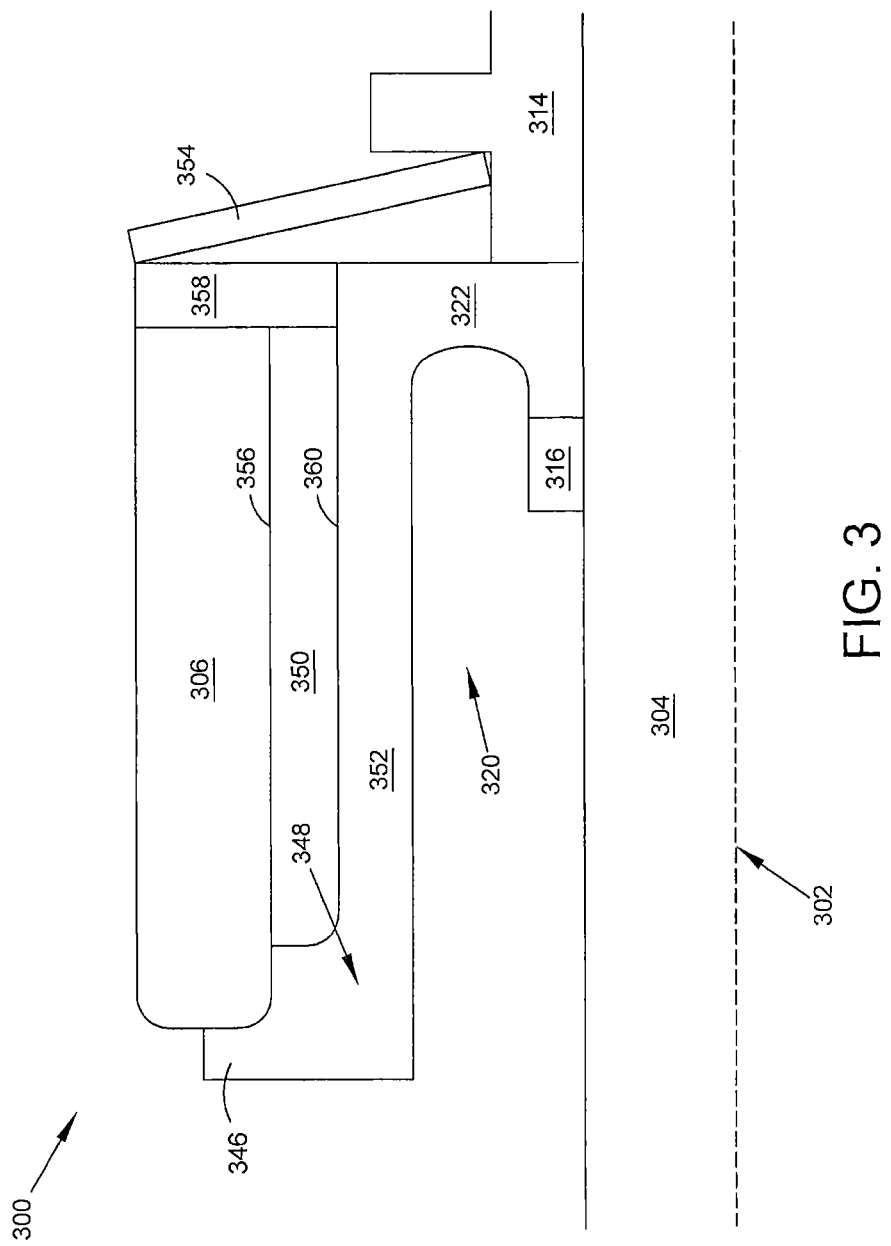
FIG. 3 is cross sectional, axial view of a circumferential seal according to some embodiments of the present disclosure.

In accordance with some embodiments of the present disclosure, a circumferential seal for a rotating machine is provided. With reference to FIG. 3, an axial view of a cross section of a circumferential seal 300 is illustrated. The circumferential seal 300 comprises a sealing runner 306, which may also be known as a sealing rotor, and a mounting element 320. The seal 300 may further comprise a radial seal (not shown) which sealingly engages the runner 306. This seal may comprise carbon.

The mounting element 320 is affixed around the circumference of shaft 304 having a rotational axis 302, and comprises base 322, support ring 352, radial pilot 348, axial flange 346, isolating element 358 and spring element 354. The mounting element may comprise a metal or any metal alloy, e.g., as steel.

Base 322 forms the radially innermost portion of mounting element 320 and may be in direct contact with shaft 304. Base 322 may form a portion of a radially outward facing surface 360. The radially outward facing surface 360 may define a cylinder, although it is not limited so.

The base 322 provides a means for maintaining the mounting element 320 in an axial position on rotor 304. In some embodiments, the mounting element 320 is subjected to an axial compressive force resulting from the assembly of the machine. This force may be transferred from or to components 316 and 314. Due to the complexities of machine design, components 316 and 314 could be any of a number of parts of a rotating machine: a spacer designed to transfer load to another component, a shoulder machined onto the shaft 304, a bearing race used to support the shaft, or a nut used to generate the axial compressive force are just a few of possible parts from which components 316 and 314 may be selected. A person of ordinary skill will recognize that these components are selected to meet the overall design requirements of the machine, and may include parts not listed above.

Extending axially from base 322 is support ring 352. Support ring 352 forms a portion of the radially outward facing surface 360. A radial pilot 348 extends radially outward from the support ring 352. Radial pilot 348 may extend from support ring proximate to an axial end of support ring 352, although it is not limited so. The radial pilot 348 defines a surface for operably engaging runner 306. Supporting ring 352 may comprise a continuous, cylindrical structure around the circumference of shaft 304 in order to prevent oil leakage between runner 306 and ring 352.

In some embodiments, axial flange 346 will extend radially outward from the radial pilot 348. The axial flange 346 may extend such that it may form a surface facing runner 306. In some embodiments, axial flange 346 extends such that there are no surfaces or material discontinuities between the axial flange 346 and the support ring 352. Axial flange 346 defines a circumferential facing surface for operably engaging runner 306.

Mounting element 320 may further comprise an isolating element 358, which may be a cylindrical washer, and a spring element 354. In some embodiments, spring element 354, isolating element 358 or both may be located at an axial end of mounting element 320. Spring element 354 operably engages isolating element 358 and the shaft 304 or other component, e.g., component 314, in order to provide an axial force which may be used to maintain the axial alignment of runner 306. Isolating element 358 is disposed between runner 306 and spring element 354 in order to provide a means to apply the force generated by spring element 354 to the runner 306 without direct contact between the two components. Further, isolating element 358 may provide an additional surface with which runner 306 forms a seal.

The runner 306 comprises a radially outward surface for sealingly engaging a ring seal and a radially inward surface 356. The radially inward surface 356 extends axially along the shaft, and may be cylindrical. In some embodiments, the radially inward surface 356 may be axially discontinuous, such that the surface may form two or more radially inward sections of different radii about the axis 302. This may form two concentric, cylindrical radially inward portions of surface 356. Similarly, the radially outward surface may define a continuous cylinder have a constant radius, or it may be axially discontinuous, such that the surface may form two or more radially outward sections of different radii about the axis 302. In some embodiments, the radially outward and inward surfaces. In some embodiments, the radially outward and inward surfaces may form a continuous, hollow cylinder.

The outward facing surface 360 of the supporting ring 352 may extend a greater axial distance along the shaft 304 than the inward facing surface 356.

The runner 306 is operably engaged by the radial pilot 348, axial flange 346 and isolating element 358 in order to maintain its axial and radial alignment. Spring element 354 transmits a force through the isolating element 358 to runner 306 in order to provide an axial clamping force between the isolating element 358 and the axial flange 346. The spring element 354 may be located at a first axial end of said runner 306 and said radial pilot 348 at a second axial end of said runner 306. Actual sealing contact will occur on the radial end ring of the runner 306. During operation, rotational motion will tend to fling oil away from this sealing joint.

In accordance with some embodiments, the spring element 354 may be a Belleville washer. Spring element 354 may be designed such that the relative thermal growth between the mounting element 320 (and shaft 304 or other components), which may be metallic, and the runner 306, which may be ceramic, can be accommodated with very little change in the axial clamping force. This feature maintains a more constant stress in the runner 306 over different operating conditions of the machine. Because the spring element 354 would not fit flush against the runner 306, isolating element 358 is disposed between to two parts in order to avoid a point stress on the runner 306. Further, as the spring element 354 moves to accommodate thermal growth, sliding will occur. The isolating element 358 may be better designed to cope with this relative movement than would the runner 306. Additionally, the isolating element 358 may be coated to accommodate the relative movement. Disposing the isolating element 358 between the runner 306 and spring element 354 therefore eliminates wear to runner 306, spring element 354, or both, that would be otherwise caused by the relative movement between the runner 306 and spring element 354. In some embodiments, the isolating element 358 may be lapped to provide a better seal between the isolating element 358 and the runner 306.

The runner 306 and the support ring 352 may define an opening 350, which may be referred to as a compliant opening. The axial length of the opening 350 relative to its radial depth (the distance between runner 306 and supporting ring 352) may be chosen to account for the mismatch in thermal growth between the runner 306 and the components with which it interfaces, directly or indirectly. This design may allow the supporting ring 352 to act as a axial beam which compliantly accommodates thermal stresses by bending, thereby avoiding overstressing the runner 306. The radial depth of opening 350 is large enough to accommodate the bending of the supporting ring 352 axial arm without allowing contact between the supporting ring 352 and runner 306 except at the radial pilot 348 and axial flange 346. A long and thin, relative to the radial thickness of the radial pilot 348 and axial flange 346, supporting ring 352 allows for the supporting ring 352 to accommodate the radial expansion of mounting member 320 with little or no relative movement between the radial pilot 348, axial flange 346 and the runner 306.

The present disclosure further provides for a continuous support ring, spring element, radial pilot and axial flange to support a runner. This disclosure provides a runner of a simpler, straightforward design requiring no additional features used to grab or attach the part relative to the mounting member feature, thereby reducing costs. The continuous support ring accommodates for differences in thermal growth between components, thereby subjecting the runner to lower stress and smaller variation of those stresses while preventing further leakage pathways. By accommodating the difference in thermal growth of components, the support ring allows the ceramic runner to be supported without being subjected to unacceptably high stresses. The spring element 354 provides a means of applying an axial clamp load of suitable magnitude to runner 306 to retain it in place axially and prevent relative motion between runner 306 and supporting ring 352 during operation. In addition to the substitution of area contacts for line contacts provides for better sealing between parts and eliminates potential high stress loading by spreading contact over larger areas.

It will be understood that the above embodiments disclose improvements to ceramic circumferential seals used in any rotating machine. While preferred embodiments of the present disclosure have been described, it is to be understood that the embodiments described are illustrative only and that the scope of the disclosure is to be defined solely by the appended claims when accorded a full range of equivalence.

We claim:

1. A circumferential seal for a machine having a rotatable shaft, said seal comprising:
   a sealing runner having a first axial end and a second axial end and a radially inward facing surface extending axially along the shaft between said ends; and
   a mounting element affixed around a circumference of the shaft, said mounting element comprising:
   a base extending radially from the shaft;
   a support ring forming a radially outward facing surface extending axially along the shaft a distance greater than said radially inward facing surface of said sealing runner, said support ring radially spaced from the shaft by said base;
   a radial pilot extending radially outward from said support ring, said radial pilot configured to maintain said sealing runner in radial alignment, wherein said radial pilot extends radially outward from said support ring proximate to said second axial end of said sealing runner;
   an axial flange extending radially outward from said radial pilot;
   an isolating element in contact with a first axial end of said sealing runner; and
   a spring element disposed proximate to said first axial end, wherein said spring element transmits a force through said isolating element to said sealing runner to clamp said sealing runner between said isolating element and said axial flange to maintain said sealing runner in axial alignment,
   wherein an axial inner end of said axial flange is in contact with an outer axial end of said sealing runner at said second axial end.

2. The circumferential seal of claim 1, wherein said support ring and said sealing runner define a radially compliant opening.

3. The circumferential seal of claim 2, wherein said compliant opening has a radial depth sufficient to accommodate the thermal and mechanical growth of said support ring without said support ring contacting said sealing runner.

4. The circumferential seal of claim 1, wherein said sealing runner further comprises a radially outward facing surface extending along the shaft, wherein each of said radially outward facing surface of said sealing runner and said radially inward facing surface of said sealing runner each define a cylinder of constant radius extending between said first and second axial ends.

5. The circumferential seal of claim 1, wherein said spring element is a belleville washer.

6. The circumferential seal of claim 1, wherein said radially inward facing surface of said sealing runner is cylindrical.

7. The circumferential seal of claim 1, wherein said radially outward facing surface of said support ring is cylindrical.

8. The circumferential seal of claim 1, wherein said isolating element is a cylindrical washer.

9. The circumferential seal of claim 1, wherein said isolating element is coated to facilitate relative motion between said isolating element and said spring element.

10. The circumferential seal of claim 1, further comprising a ring seal for sealingly engaging a radially outward facing surface of said sealing runner.

11. The circumferential seal of claim 10, wherein said ring seal comprises carbon.

12. The circumferential seal of claim 1, wherein said radial pilot extends radially outward from said support ring proximate to an axial end of said support ring.

13. The circumferential seal of claim 1, wherein a surface of said isolating element that is in contact with said sealing runner, and a surface of said sealing runner that is in contact with said isolating element are each lapped.

14. The circumferential seal of claim 1, wherein said mounting element is affixed to the shaft via an axially compressive force.

15. A circumferential seal for a machine having a metallic rotatable shaft, said seal comprising:

a ceramic sealing runner having a radially inward facing cylindrical surface extending axially along the shaft; and a mounting element affixed around a circumference of the shaft, said mounting element comprising:
  a base extending radially from the shaft;
  a support ring forming a radially outward facing cylindrical surface extending axially along the shaft a distance greater than said radially inward facing cylindrical surface of said ceramic sealing runner, said support ring radially spaced from the shaft by said base;
  a radial pilot extending radially outward from said support ring to engage a first axial end of said ceramic sealing runner, said radial pilot configured to maintain said ceramic sealing runner in radial alignment;
  an axial cylindrical flange extending radially outward from said radial pilot;
  a cylindrical washer in contact with a second axial end of said ceramic sealing runner; and
  a belleville washer disposed proximate to said second axial end, wherein said belleville washer transmits a force through said cylindrical washer to said ceramic sealing runner to clamp said ceramic sealing runner between said cylindrical washer and said axial cylindrical flange to maintain said ceramic sealing runner in axial alignment,
  wherein said first axial end is axially located between said axial cylindrical flange and said second axial end,
  wherein an axial inner end of said axial cylindrical flange is in contact with an outer axial end of said ceramic sealing runner at said first axial end, and
  wherein an area of contact between said axial cylindrical flange and said ceramic sealing runner is located a radial distance from an axis of said shaft that is equal to a second radial distance from the axis of said shaft to a second area of contact between said cylindrical washer and said ceramic sealing runner.

16. A method of mounting a ceramic seal runner in a rotatable machine, comprising:
  providing a seal runner having a radially inward facing surface extending along a shaft of said machine;
  providing a mounting element extending along the shaft of said machine and having:
    a based extending radially from the shaft;
    a support ring forming a radially outward facing surface facing said radially inward facing surface of said seal runner, said support ring radially spaced from the shaft by said base;
    a radial pilot extending radially outward from said support ring;
    an axial flange extending radially outward from said radial pilot;
    a spring element; and
    an isolating element;
  engaging a first axial end of said seal runner with said isolating element;
  engaging a second axial end of said seal runner with said axial flange and said radial pilot such that an axial inner end of said axial flange is in contact with an axial outer end of said second axial end of said seal runner; and
  engaging the isolating element with said spring element, such that a compressive force is transmitted through said isolating element and seal runner to said axial flange, thereby maintaining an axial alignment of the seal runner relative to said shaft, and wherein said radial pilot maintains a radial alignment of said seal runner about said shaft of said machine,
  wherein said seal runner is axially located between said isolating element and said axial flange.

17. The method of claim 16, further comprising:
  lapping a portion of said first axial end of said seal runner in contact with said isolating element; and
  lapping a portion of said isolating element in contact with said first axial end of said seal runner.

18. The method of claim 16, further comprising:
  coating a surface of said isolating element in contact with said spring element to aid relative motion between said surface and said spring element.

19. The method of claim 16, further comprising:
  providing a radially compliant opening between said seal runner and said support ring, wherein said compliant opening is configured to accommodate relative thermal and mechanical growth between said seal runner and said support ring without said support ring contacting said seal runner.

\* \* \* \* \*